US008509492B2

(12) United States Patent
Blair

(10) Patent No.: US 8,509,492 B2
(45) Date of Patent: *Aug. 13, 2013

(54) DETECTION OF COLOR SHIFTING ELEMENTS USING SEQUENCED ILLUMINATION

(75) Inventor: Ronald Bruce Blair, Flower Mound, TX (US)

(73) Assignee: De La Rue North America Inc., Irving, TX (US)

( * ) Notice: Subject to any disclaimer, the term of this patent is extended or adjusted under 35 U.S.C. 154(b) by 423 days.

This patent is subject to a terminal disclaimer.

(21) Appl. No.: 12/683,932

(22) Filed: Jan. 7, 2010

(65) Prior Publication Data

US 2011/0164804 A1 Jul. 7, 2011

(51) Int. Cl.
*G06K 9/00* (2006.01)

(52) U.S. Cl.
USPC .......................................... 382/112; 382/162

(58) Field of Classification Search
USPC .......................................... 382/112, 135, 165
See application file for complete search history.

(56) References Cited

U.S. PATENT DOCUMENTS 4,525,630 A 6/1985 Chapman
4,650,319 A 3/1987 Stenzel et al.
4,935,628 A 6/1990 Martin et al.
5,498,879 A 3/1996 De Man
6,111,261 A 8/2000 Bolza-Schunemann et al.
6,201,892 B1 3/2001 Ludlow et al.
6,249,591 B1 6/2001 Tullis
6,256,407 B1 * 7/2001 Mennie et al. ................ 382/135
6,347,163 B2 2/2002 Roustaei
6,405,929 B1 6/2002 Ehrhart et al.
6,766,045 B2 7/2004 Slepyan et al.
6,839,128 B2 1/2005 Premjeyanth et al.
6,913,260 B2 7/2005 Maier et al.
6,937,322 B2 * 8/2005 Gerz et al. ...................... 356/71
6,962,247 B2 11/2005 Maier et al.
6,970,235 B2 11/2005 Christophersen (Continued)

FOREIGN PATENT DOCUMENTS

CN 1950857 A 4/2007
EP 1250682 B1 8/2005

(Continued)

OTHER PUBLICATIONS

PCT/US2009/063146 Written Opinion of the International Searching Authority; Mailed Jun. 22, 2010; Applicant: De La Rue North America, Inc.

(Continued)

*Primary Examiner* — John Strege
(74) *Attorney, Agent, or Firm* — Patton Boggs LLP

(57) ABSTRACT

The present invention provides a method and apparatus for determining the presence of Color Shifting Elements (CSE) such as optically variable inks and foils on documents such as bank notes. The invention comprises passing a document past an image sensor such as a line scan camera while sequentially illuminating the document from at least two alternating azimuths. The light source at each azimuth alternates between different colors, producing an image that is interleaved according to color and azimuth of illumination. The invention calculates a reflected color value for each azimuth and compares the color values of the different azimuths to each other. A difference in color between azimuths of illumination indicates the presence of a CSE on the document.

17 Claims, 9 Drawing Sheets

(56) References Cited

U.S. PATENT DOCUMENTS

| | | | | |
|---|---|---|---|---|
| 7,218,386 | B2 | 5/2007 | Alcock et al. | |
| 7,372,990 | B2 * | 5/2008 | Yamauchi et al. | 382/166 |
| 7,583,846 | B2 * | 9/2009 | Yamauchi et al. | 382/232 |
| 7,599,544 | B2 | 10/2009 | Moshe | |
| 7,657,112 | B2 * | 2/2010 | Kuwabara | 382/260 |
| 7,715,613 | B2 | 5/2010 | Dobbs et al. | |
| 7,737,417 | B2 | 6/2010 | Giering et al. | |
| 7,864,381 | B2 | 1/2011 | Scott | |
| 7,978,899 | B2 | 7/2011 | Jenrick et al. | |
| 8,004,725 | B2 | 8/2011 | Schnitzlein | |
| 8,184,852 | B2 | 5/2012 | Hofman et al. | |
| 8,225,989 | B1 | 7/2012 | Turocy et al. | |
| 8,265,346 | B2 | 9/2012 | Blair | |
| 8,290,216 | B1 | 10/2012 | Blair | |
| 2001/0041015 | A1 | 11/2001 | Chui | |
| 2003/0030785 | A1 | 2/2003 | Christophersen | |
| 2003/0174878 | A1 * | 9/2003 | Levin et al. | 382/149 |
| 2004/0051862 | A1 * | 3/2004 | Alcock et al. | 356/71 |
| 2004/0208373 | A1 | 10/2004 | Aoki et al. | |
| 2006/0072123 | A1 | 4/2006 | Wilson et al. | |
| 2006/0115139 | A1 | 6/2006 | Joshi et al. | |
| 2006/0159329 | A1 | 7/2006 | Joshi et al. | |
| 2006/0249951 | A1 | 11/2006 | Cruikshank et al. | |
| 2007/0216976 | A1 * | 9/2007 | Endo et al. | 359/2 |
| 2008/0054545 | A1 | 3/2008 | Calverley et al. | |
| 2008/0116628 | A1 | 5/2008 | Edwards et al. | |
| 2009/0310126 | A1 | 12/2009 | Klock et al. | |
| 2010/0128964 | A1 | 5/2010 | Blair | |
| 2010/0128965 | A1 * | 5/2010 | Blair | 382/135 |
| 2011/0090485 | A1 | 4/2011 | Cronin et al. | |

FOREIGN PATENT DOCUMENTS

| | | |
|---|---|---|
| JP | 10-116369 | 5/1998 |
| JP | 2003-272022 | 9/2003 |
| JP | 2006053736 A | 2/2006 |
| KR | 1020010090049 | 10/2001 |
| KR | 1020080094426 | 10/2008 |

OTHER PUBLICATIONS

PCT/US2010/047485 Written Opinion of the International Searching Authority; Mailed May 30, 2011; Applicant: De La Rue North America, Inc.

U.S. Appl. No. 12/277,936; Non-Final Office Action dated Jul. 20, 2011; First Named Inventor: Ronald Bruce Blair.

U.S. Appl. No. 12/277,936; Final Office Action dated Dec. 20, 2011; First Named Inventor: Ronald Bruce Blair.

U.S. Appl. No. 12/323,109; Notice of Allowance dated Dec. 1, 2011; First Named Inventor: Ronald Bruce Blair.

PCT/US2009/063148 Written Opinion of the International Searching Authority; Mailed Jun. 22, 2010; Applicant: De La Rue North America, Inc.

U.S. Appl. No. 61/239,345, filed Sep. 2, 2009, Parkov.

U.S. Appl. No. 61/239,655, filed Sep. 3, 2009, Parkov.

U.S. Appl. No. 12/277,936; Non-Final Office Action dated May 22, 2012; First Named Inventor: Ronald Bruce Blair.

U.S. Appl. No. 12/323,109; Notice of Allowance dated Mar. 21, 2012; First Named Inventor: Ronald Bruce Blair.

Response filed Aug. 22, 2012 for U.S. Appl. No. 12/277,936.

Final Office Action date mailed Oct. 22, 2012 for U.S. Appl. No. 12/277,936.

RCE/Response filed Feb. 19, 2013 for U.S. Appl. No. 12/277,936.

RCE filed Jun. 19, 2012 for U.S. Appl. No. 12/323,109.

Notice of Allowance date mailed Jul. 12, 2012 for U.S. Appl. No. 12/323,109.

Notice of Allowance date mailed Aug. 31, 2012 for U.S. Appl. No. 13/539,155.

Non-Final Office Action date mailed Mar. 5, 2013 for U.S. Appl. No. 13/609,040.

Non-Final Office Action date mailed Sep. 10, 2012 for U.S. Appl. No. 12/984,476.

Response filed Dec. 10, 2012 for U.S. Appl. No. 12/984,476.

Notice of Allowance date mailed Jan. 9, 2013 for U.S. Appl. No. 12/984,476.

Restriction Requirement date mailed Oct. 3, 2012 for U.S. Appl. No. 12/872,960.

Response filed Oct. 30, 2012 for U.S. Appl. No. 12/872,960.

Non-Final Office Action date mailed Feb. 25, 2013 for U.S. Appl. No. 12/872,960.

Chinese Office Action date mailed Mar. 1, 2013; Chinese Application No. 200980146901.9.

* cited by examiner

| Line | Red | Green | Blue | IR |
|---|---|---|---|---|
| 1 | 255 | 0 | 0 | 0 |
| 2 | 0 | 255 | 0 | 0 |
| 3 | 0 | 0 | 255 | 0 |
| 4 | 0 | 0 | 0 | 255 |
| 5 | 255 | 255 | 255 | 0 |

700

| | Azimuth 1 | | | Azimuth 2 | | |
|---|---|---|---|---|---|---|
| Line | Red | Green | Blue | Red | Green | Blue |
| 1 | 255 | 0 | 0 | 0 | 0 | 0 |
| 2 | 0 | 0 | 0 | 255 | 0 | 0 |
| 3 | 0 | 255 | 0 | 0 | 0 | 0 |
| 4 | 0 | 0 | 0 | 0 | 255 | 0 |
| 5 | 0 | 0 | 255 | 0 | 0 | 0 |
| 6 | 0 | 0 | 0 | 0 | 0 | 255 |

800

FIG. 8

DETECTION OF COLOR SHIFTING ELEMENTS USING SEQUENCED ILLUMINATION

CROSS-REFERENCE TO RELATED APPLICATION

This application is related to co-pending application Ser. No. 12/277,936 filed Nov. 25, 2008, entitled "Sequenced Illumination," the technical disclosures of which are hereby incorporated herein by reference.

BACKGROUND OF THE INVENTION

1. Technical Field

The present invention relates generally to currency processing machines, and more specifically to a system and method for detecting optically variable ink on notes by recording images of the notes using multiple modes of illumination that facilitate optimal imaging of specific features.

2. Description of Related Art

Automated, high-volume currency processing is a growing international industry affecting numerous aspects of the distribution, collection, and accounting of paper currency. Currency processing presents unique labor task issues that are intertwined with security considerations. It requires numerous individual tasks, for example: the collection of single notes by a cashier or bank teller, the accounting of individual commercial deposits or bank teller pay-in accounts, the assimilation and shipment of individual deposits or accounts to a central processing facility, the handling and accounting of a currency shipment after it arrives at a processing facility, and the processing of individual accounts through automated processing machines. Any step in the process that can be automated, thereby eliminating the need for a human labor task, saves both the labor requirements for processing currency and increases the security of the entire process. Security is increased when instituting automated processes by eliminating opportunities for theft, inadvertent loss, or mishandling of currency and increasing accounting accuracy.

A highly automated, high-volume processing system is essential to numerous levels of currency distribution and collection networks. Several designs of high-volume processing machines are available in the prior art and used by such varied interests as national central banks, independent currency transporting companies, currency printing facilities, and individual banks. In general, currency processing machines utilize a conveyer system which transports individual notes past a series of detectors. By way of example, a note may be passed through a series of electrical transducers designed to measure the note's width, length, and thickness. The next set of sensors could be optical sensors recording the note's color patterns or serial number. Detectors can likewise be used to detect specific magnetic or other physical characteristics of individual notes.

High volume currency processing machines typically pull individual notes from a stack of currency through a mechanical conveyer past several different detectors in order to facilitate the sorting of the individual notes and the accumulation of data regarding each note fed through the machine. For example, a currency processing machine can perform the simple tasks of processing a stack of currency in order to ensure that it is all of one denomination with proper fitness characteristics while simultaneously counting the stack to confirm a previous accounting. A slightly more complex task of separating a stack of currency into individual denominations while simultaneously counting the currency can be accomplished as well.

On the more complex end of prior art currency processing machines, a stack of currency consisting of various denominations can be fed into the machine for a processing that results in the separation of each denomination, a rejection of any currency that does not meet fitness specifications, the identification of counterfeit bills, and the tracking of individual notes by serial number. The detection of counterfeit bills in particular is an increasingly complex task as the number of anti-counterfeiting features incorporated into currency notes increase both in number and sophistication.

Among the most effect security measures in use are color shifting elements (CSE) such as optical variable ink (OVI), color shifting foils, and similar materials. These elements produce different reflective colors (e.g., magenta and green) at different angles of incidence and reflection. CSEs are widely used security features on major currencies such as the US dollar and the Euro and similar documents. CSEs are typically classified as public security features, meaning they are overt and easily recognizable by the members of the general public upon visual inspection of the note, in contrast to esoteric security features like magnetic strips that are only detected by specialized equipment. Because CSEs such as optically variable inks and foils are considered public security features there are no CSE detectors on high-speed currency sorters.

SUMMARY OF INVENTION

The present invention provides a method and apparatus for determining the presence of Color Shifting Elements (CSE) such as optically variable inks and foils on documents such as bank notes. The invention comprises passing a document past an image sensor such as a line scan camera while sequentially illuminating the document from at least two alternating azimuths, wherein a different angle of incidence of illumination is used for each line scanned by the camera, producing an interleaved image of the document. In a preferred embodiment, the light source at each azimuth alternates between different colors, producing an image that is interleaved according to color and azimuth of illumination. A transform is extracted from each azimuth of illumination to produce a reflected color value for that azimuth such as a hue value or red/green ratio. The reflected color values of the two azimuths are compared to each other. A difference in reflected colors between azimuths of illumination indicates the presence of a CSE on the document.

BRIEF DESCRIPTION OF THE DRAWINGS

The novel features believed characteristic of the invention are set forth in the appended claims. The invention itself, however, as well as the preferred mode of use, further objectives and advantages thereof, will be best understood by reference to the following detailed description of illustrative embodiments when read in conjunction with the accompanying drawings, wherein:

FIG. 8 shows a lookup table used to control multi-azimuth sequenced illumination for CSE detection in accordance with the present invention;

DETAILED DESCRIPTION

Figure 1:
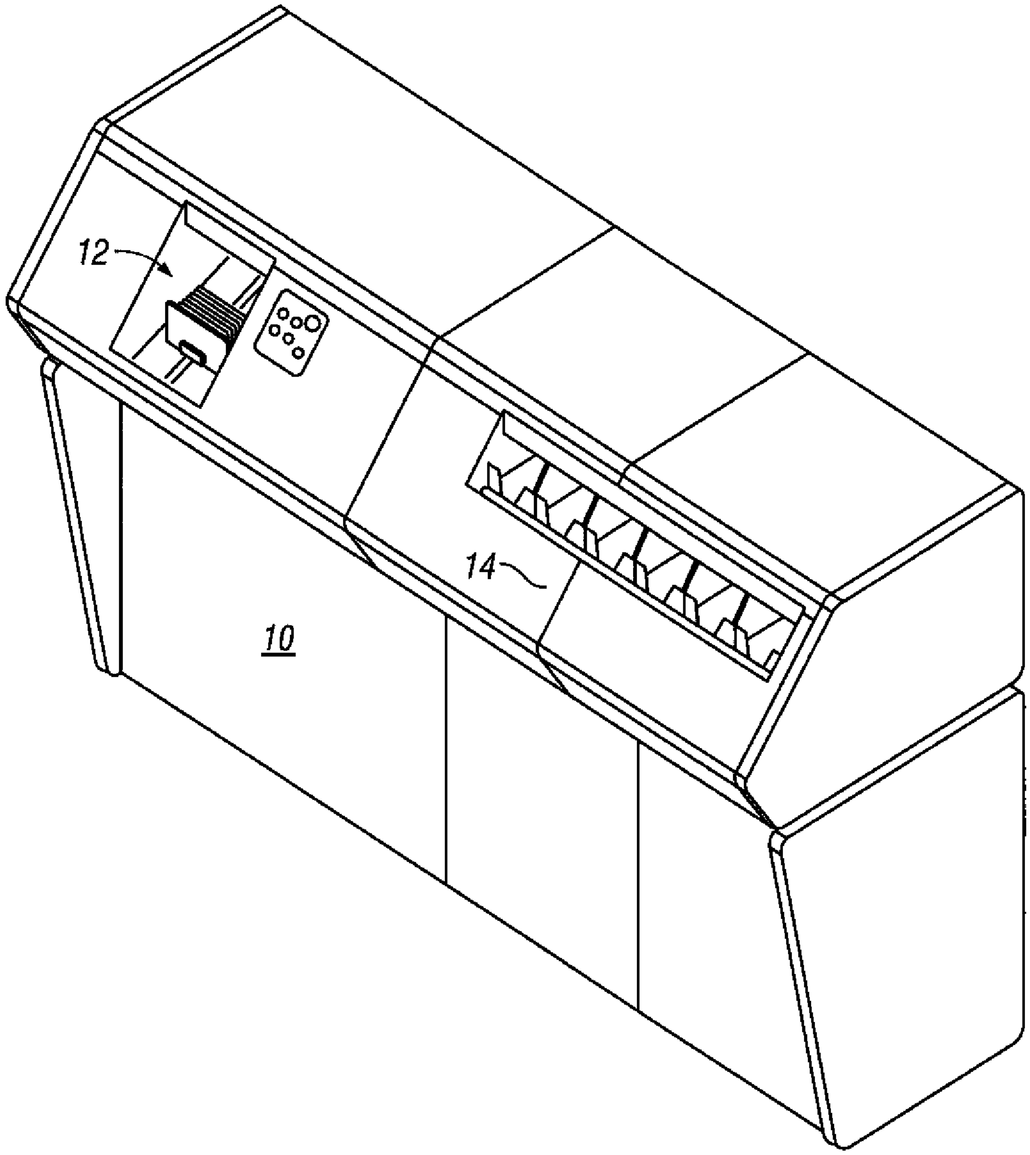
FIG. 1 shows a currency processing machine embodying the present invention and loaded with a batch feed of currency prior to starting the currency processing cycle.

FIG. 1 shows a currency processing machine 10 embodying the present invention and loaded with a batch feed of currency 12 prior to starting the currency processing cycle. This batch feed of currency 12 is fed into the currency processing machine one single note at a time. Single notes then travel on a conveyer past several different detectors before being deposited in one of the sort bins 14. Typically, a single sort bin is used to accumulate a single denomination of note at the end of the sort process.

The limitation of the prior art imaging techniques is that they rely on reflectance measurements over a single spectrum of light, producing a one dimensional metric. The present invention replaces the single white light reflectance measurement of the prior art with sequenced illumination using different wavelengths of light (e.g., red, green, blue, UV, IR). Soiling of the note (including ink wear) produces different reflectance effects in each color, which are not visible in a single white light image.

Figure 2:
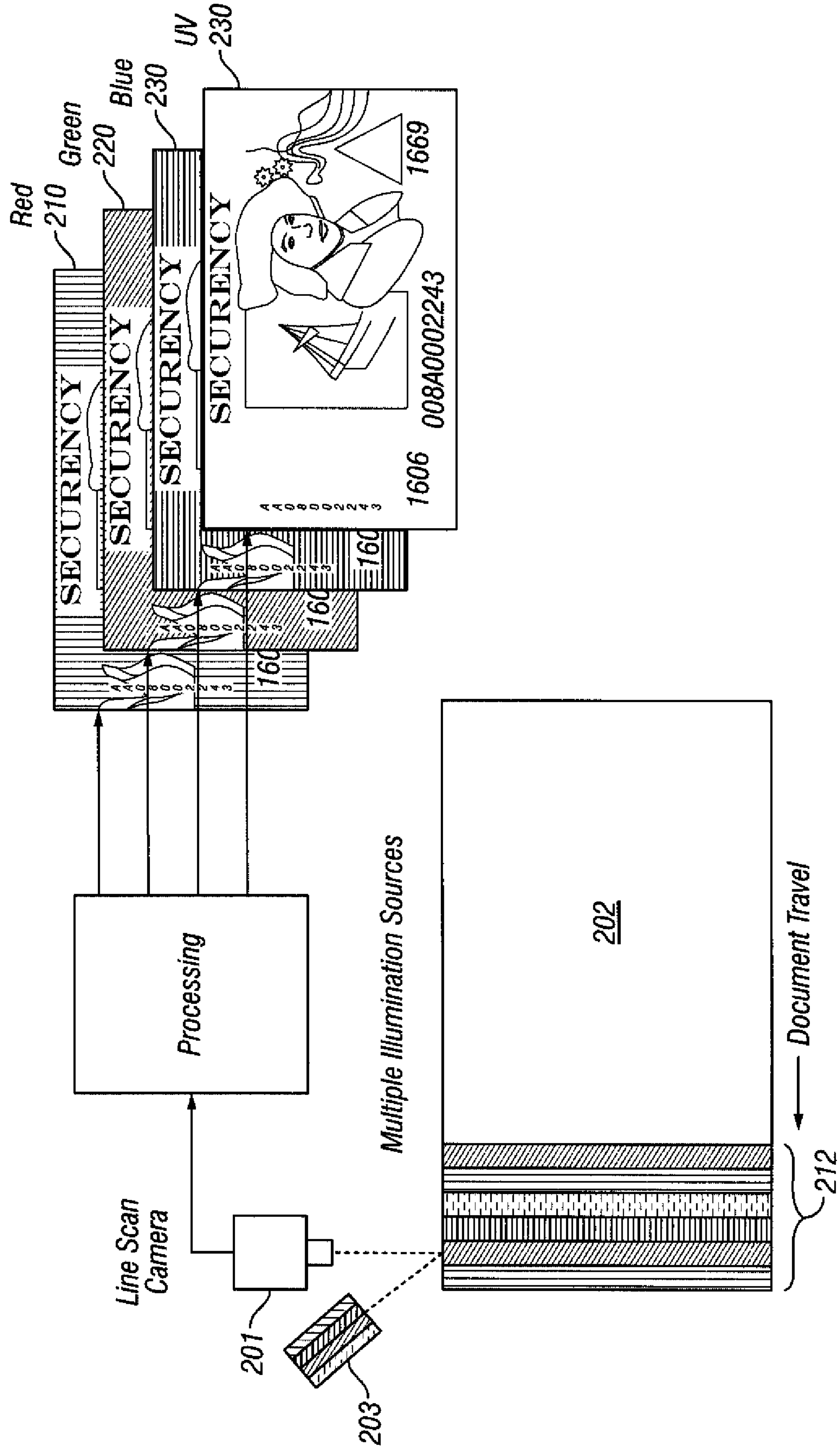
FIG. 2 illustrates the operation of sequenced illumination in bank note imaging in accordance with the present invention.

FIG. 2 illustrates the operation of sequenced illumination in bank note imaging in accordance with the present invention. The invention uses a standard line scan camera 201 to capture an image of a note 202 as the note passes by in the direction indicated by the arrow. A light source (light stick) 203 illuminates the passing note 202 using light emitting diodes (or similar light elements) that emit different wavelengths of light in a variable, sequential manner.

This sequenced illumination produces an interleaved image in which each line scanned by the camera 201 is recorded under the illumination of a different wavelength of light in a pre-determined sequence (e.g., red, green, blue, UV, red, green, blue, UV, etc) until the entire note 202 is scanned. FIG. 2 shows the interleaved pattern 212 superimposed on the note 202 to help illustrate this concept. In the present example, the interleaved image can be separated into red 210, green 220, blue 230, and ultraviolet (UV) 240 reflective images. The repeating RGBUV pattern used in FIG. 2 is a simplified example, but it clearly illustrates the concept.

At a minimum, the light source 203 uses two different wavelengths. In a preferred embodiment, four wavelengths are used. The illumination switching between the different colors is synchronized with the image capture by the camera 201 and may use a simple repeating pattern such as that described above or a more complex pattern (explained in more detail below).

Figure 3:
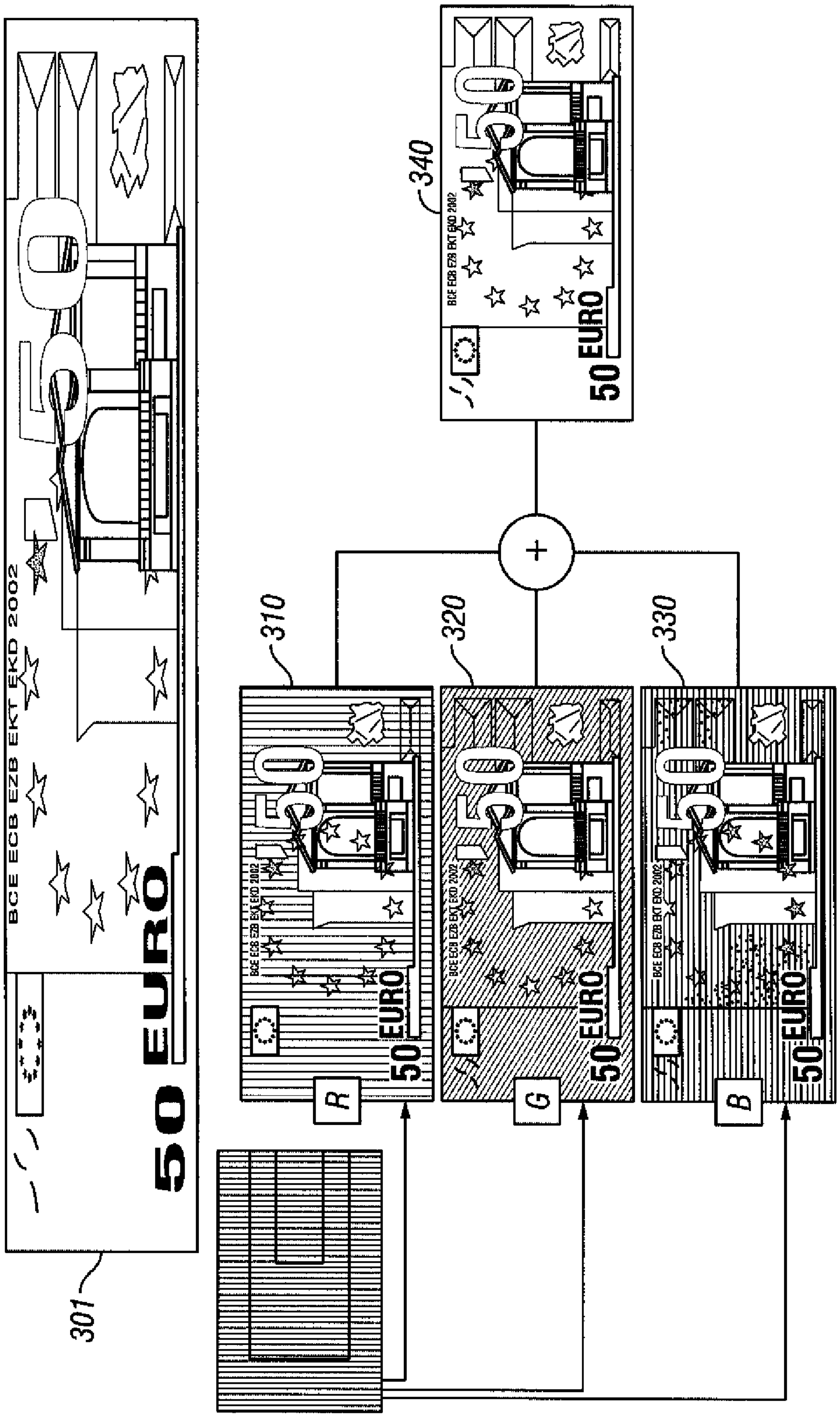
FIG. 3 shows an example of a raw interleaved image recorded by the line scan camera and its division into separate RGB images in accordance with the present invention.

FIG. 3 shows an example of a raw interleaved image 301 recorded by the line scan camera. This image includes all of the lines scanned under different wavelengths of light (e.g., RGB) combined together in sequence. The interleaved image 301 is elongated because the image is sampled at a higher rate than single reflectance white light illumination to preserve image resolution. Below the interleaved image 301 are the individual images 310, 320, 330 that result from separating the scan lines according to color (red, green and blue). The separate RGB images 310, 320, 330 can be combined into a single composite image 340 equivalent to white light illumination. The composite image can serve as the white light reflectance image against which the individual color reflectance images can be compared.

It should be emphasized that images 310, 320, 330 are not color images. All of the scan lines, regardless of the color emitted by the light source, are recorded by the same camera in greyscale. However, the reflection of light will differ according to the color of the light. This is due to the way photons of different wavelengths interact with ink and surface features on the note (including soiling). As a consequence, even though the reflective images produced under different wavelengths of illumination are all recorded in greyscale, each image reveals features not seen in the others, as shown in FIG. 3.

An essential element of the efficacy of the present invention is the recording of the different wavelength images at the same location by the same camera. If the different images were recorded separately at different locations, slight variations in the position of the note relative to each camera would make it more difficult to composite and compare the separate wavelength images, thereby greatly reducing the accuracy of the image analysis.

Whereas the prior art is limited to merely measuring the reflectance over a fixed spectrum in terms of brighter or darker, the present invention allows the cross referencing of reflected light of different wavelengths and different illumination modes.

In addition to using different wavelengths of reflected light, sequenced illumination may also alternate between reflective and transmissive illumination, as well as illumination from different angles of incidence to the note (different azimuths).

Figure 4:
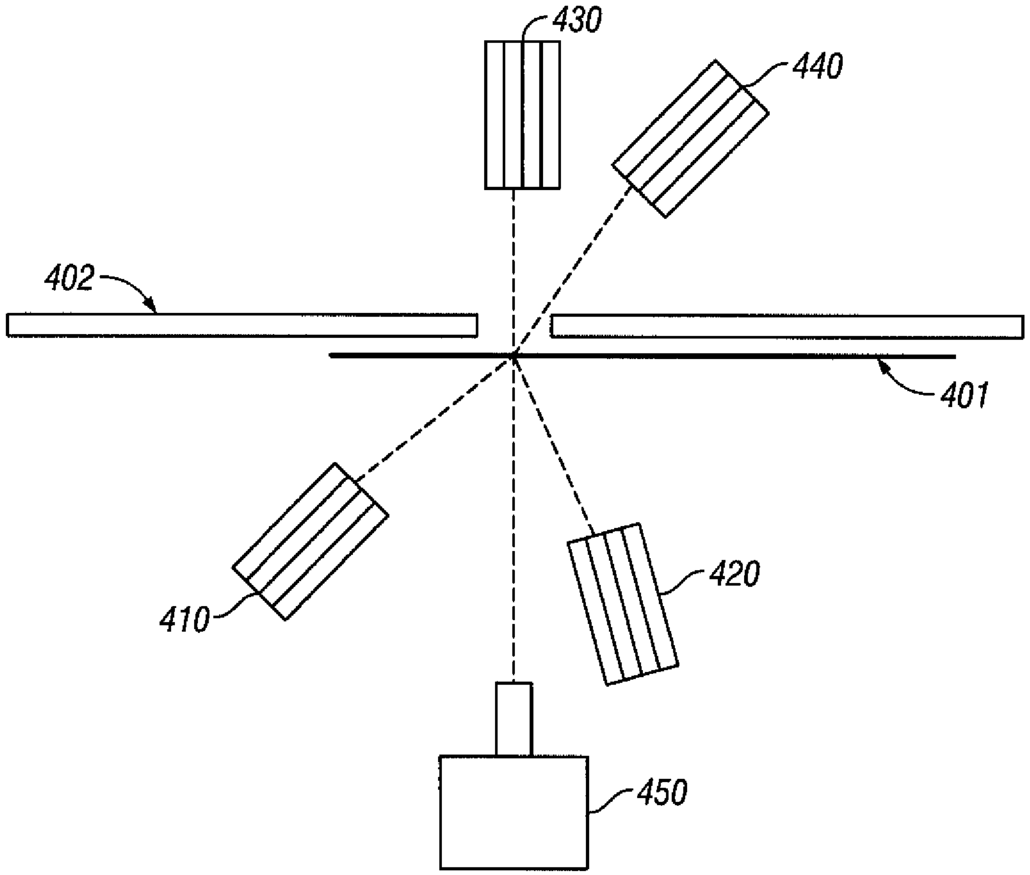
FIG. 4 shows an arrangement of light sources capable of implementing the different modes of sequenced illumination in accordance with the present invention.

FIG. 4 shows an arrangement of light sources capable of implementing the different modes of sequenced illumination in accordance with the present invention. Whereas the example shown in FIG. 2 only covers the multi-wavelength reflectance mode of sequential illumination, the configuration shown in FIG. 4 also covers the multi-azimuth and reflective/transmissive modes.

In this example, the currency note 401 moves along a straight note guide 402 in the currency processor. It should be pointed out that in some embodiments, the note guide 402 may be curved. However, the straight note guide in the present example allows for easier illustration.

Light sources 410 and 420 are used in the multi-azimuth mode of operation. Similar to the light source shown in FIG. 2, light sources 410 and 420 can each illuminate the passing note 401 using alternating wavelengths as described above. Because light sources 410 and 420 are positioned at different azimuths relative to the note 401, the reflected image recorded by the line scan camera 450 will differ between the two azimuths if the note includes features printed with a color shifting element such as optically variable ink (OVI). Therefore, in addition to interleaving different reflected wavelengths from the same light source (as shown in FIG. 2), the present invention can also interleave reflective images produced by different azimuths of illumination.

Color Shifting Elements (CSE) produce different reflective colors (e.g., magenta and green) at different angles of incidence and reflection, even if the spectrum of illumination is the same for both angles (e.g., white light). CSEs include optically variable ink (OVI), optically variable foils, and similar types of color shifting materials. After more than a decade in circulation, CSEs have remained a widely used public security feature on bank notes and similar documents, easily identifiable by the general public. However, currently there are no CSE detectors on high-speed currency sorters.

The multi-azimuth mode of sequenced illumination of the present invention provides an effective means for detecting CSEs without the need for additional specialized equipment, thereby filling a security gap in present high-speed processors. Not only does the present invention allow for the detection of CSEs on notes, it can also be used to evaluate their fitness.

Figure 5B:
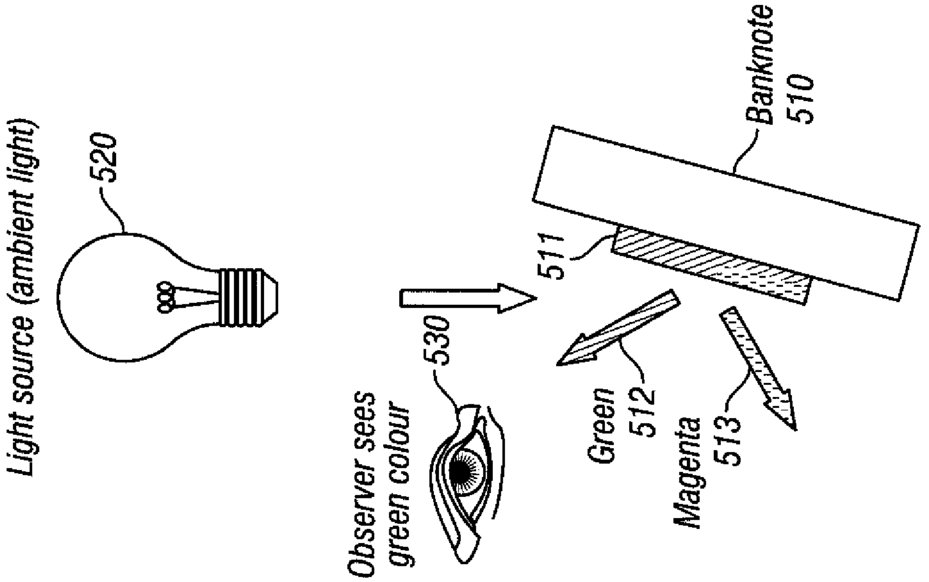
FIGS. 5A and 5B illustrate how the light color reflected by color shifting elements (CSE) differs for the observer depending on the angle of incidence and reflectance.
Figure 5A:
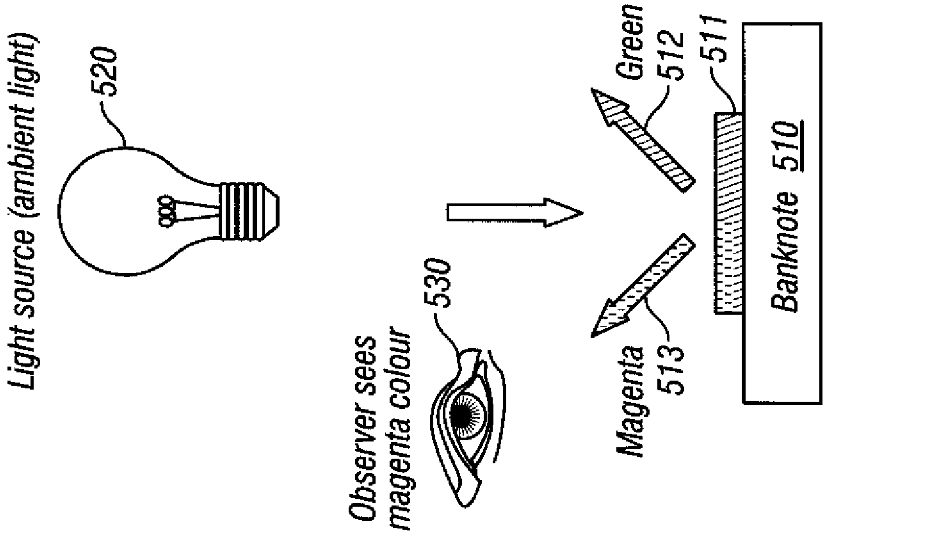

FIGS. 5A and 5B illustrate how the light color reflected by CSEs differs for the observer depending on the angle of incidence and observation. In FIG. 5A, the incidence of illumination to the CSE 511 is approximately perpendicular, producing different reflective colors depending on the position of the observer 530 relative to the CSE. In the present example, the light reflected by the CSE is green in one direction 512 and magenta in the opposite direction 513, with the observer 530 seeing the magenta reflection as shown in the figure.

If the light source 520 and observer 530 are held in the same position relative to each other, the only way for the observer in this example to see the green reflectance 512 is to change the angle of the bank note 510 and its CSE 511 relative to the light source and observer, as shown in FIG. 5B. This presents a problem for high speed sorters in which the observer is a camera at a fixed angle of incidence relative to the note. For obvious practical reasons, the angle of the passing note cannot be changed relative to the camera in the manner shown in FIGS. 5A and 5B in order to detect both reflective colors during high speed processing.

Figures 6, 7:
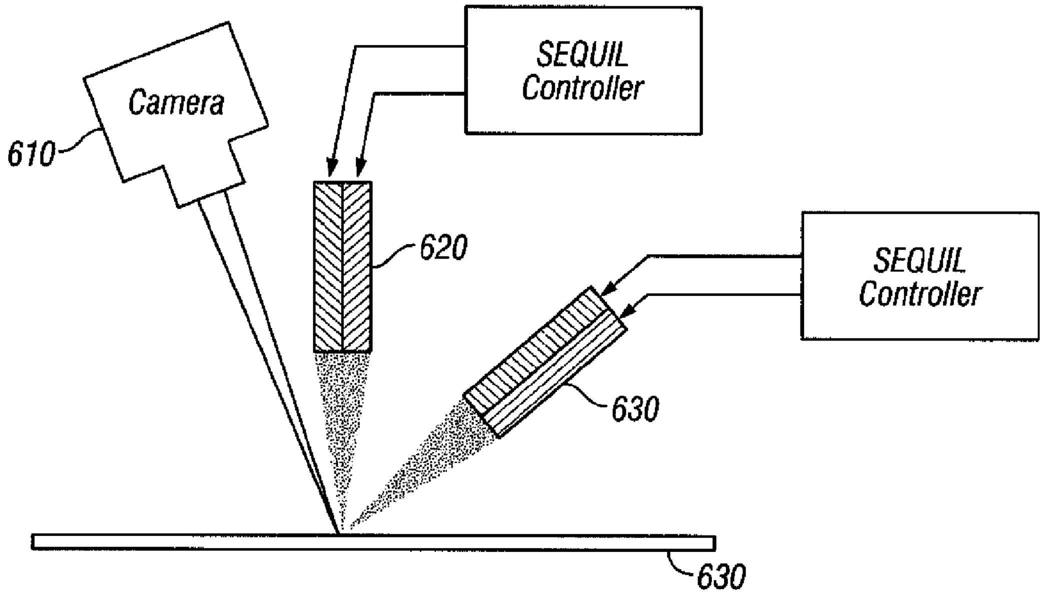
FIG. 6 shows an arrangement of light sources for implementing multi-azimuth sequenced illumination to detect CSEs in accordance with the present invention.
FIG. 7 illustrates an example lookup table used to control sequenced illumination in accordance with the present invention.

The present invention overcomes this difficulty by manipulating the angle of illumination and reflection while leaving the angle between the camera and the note constant. As shown in FIG. 6, the camera 610 maintains a fixed viewing angle relative to the note 640. To detect the presence of the CSE, illumination is provided by two light sources 620, 630 positioned at different azimuths relative to the note and camera. In this example, the first light source 620 is approximately perpendicular to the document 640. The second light source 630 is positioned at a much shallower angle. The different angles of incidence and reflection of the light sources 620, 630 produce different reflective colors from the CSE without having to change the angle of the camera 610.

In addition to alternating the azimuth of illumination, each of the light sources 620, 630 has multiple LEDs, allowing each light source to illuminate the CSE with different colors in an interleaved pattern as described above.

The sequenced illumination allows the present invention to interleave the different reflective colors to produce a composite image of the CSE feature on the document. As with the above example, the images produced by the different reflective colors of the CSE are not color images but instead are recorded in greyscale. However, the image of the CSE is slightly different for each reflected wavelength.

It should be emphasized that CSEs are not limited to reflecting only two different wavelengths. CSEs may reflect three or more different colors at different angles of incidence and reflection. Applying this option to the present invention would therefore entail a separate light source at each azimuth of illumination corresponding to each reflected color. However, for ease of illustration the present example restricts itself to a two-color CSE.

Furthermore, the wavelengths reflected by CSEs do not have to be in the visible range. Typically CSEs are used as public security features that are overt and easily recognizable by members of the general public upon visual inspection. However, by enabling CSE detection during high speed processing, the present invention permits the introduction of covert CSEs that shift between non-visible wavelengths of light. For example, a currency note might include a CSE that shifts between different IR wavelengths. Obviously such non-visible CSEs are intended only for high speed processing and may complement the visible CSEs used for visual verification by the public.

FIG. 7 illustrates an example lookup table used to control sequenced illumination in accordance with the present invention. The lookup table 700 is stored in the memory of the control system. There is a separate memory address for each line of the image recorded by the camera, represented by the rows in the table. Each column represents a different source of illumination, which includes all of the LEDs on all of the light sticks in the machine.

The lookup table shown in FIG. 7 is a simplified example that only includes five image scan lines and four illumination sources. In this example, the illumination sources are the different color LEDs present in one light stick, which are red, green, blue and infrared (IR). The number at the intersection of each row and column is the control byte applied to each LED array during the recording of that image line. The control bytes determine the intensity of illumination produced by the LED in question. In the present example, a value of 255 represents full intensity, while a value of 0 represents off. In one embodiment, the control system might employ a value of 128, representing half intensity.

Applying this lookup table to the sequential illumination of a note, scan line 1 would be illuminated by red light, while the remaining LEDs remain off. For line 2, only the green LED is lit. Similarly, only the blue LED is lit for line 3, and only the IR LED is lit for line 4. For line 5, the red, green and blue LEDs are all lit at full intensity while the IR LED is off, thereby producing a white light reflectance.

FIG. 8 shows a lookup table used to control multi-azimuth sequenced illumination for CSE detection in accordance with the present invention. Whereas the example lookup table 700 in FIG. 7 illustrates the generic operation of a single light source with multiple LEDs, the table 800 in FIG. 8 illustrates one possible control sequence for producing a six-way interleaved image using two light sources positioned at different azimuths relative to the note.

The illumination sequence shown in FIG. 8 maintains the RGB sequence but alternates between the light sources for each color, thereby interleaving the high azimuth RGB sequence with the low azimuth RGB sequence. Therefore, the first scan line imaged by the camera is under red illumination provides by the light source at azimuth 1. The second scan line is also imaged under red illumination but this time from the light source at azimuth 2. The sequence then returns to azimuth 1 and now uses green illumination for scan line 3, and so on. The process continues back and forth alternating between the first and second azimuths for each color before moving to the next color, until the specified number of scan lines is imaged. In the present example, only six scan lines are shown in order to illustrate a complete RGB sequence for both azimuths, but the actual number of scan lines imaged will depend on the size of the color shifting element in question.

Figure 9:
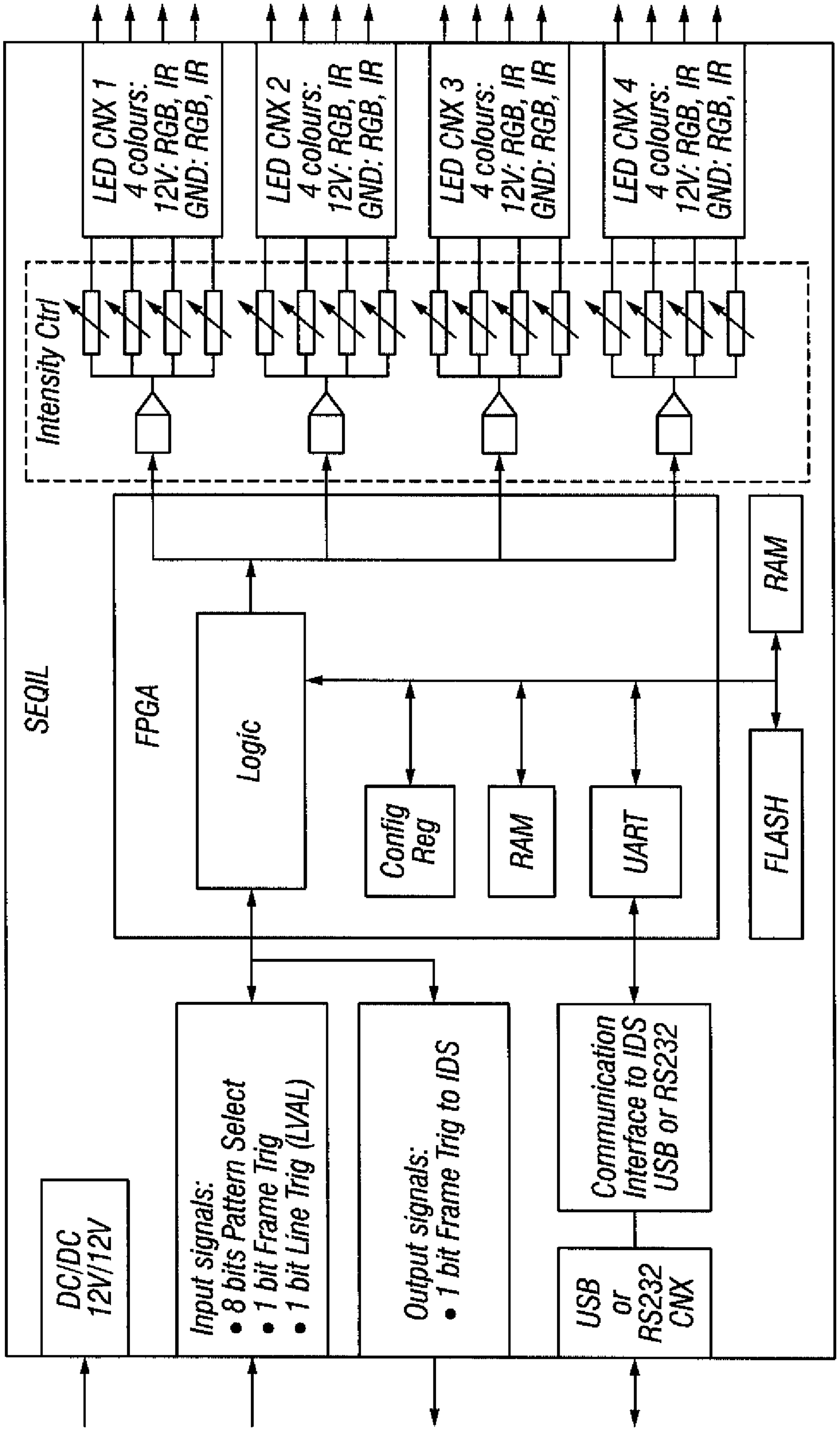
FIG. 9 is a simplified block diagram of the control system used for sequenced illumination in accordance with the present invention.

FIG. 9 is a simplified block diagram of the control system used for sequenced illumination in accordance with the present invention.

Figure 10:
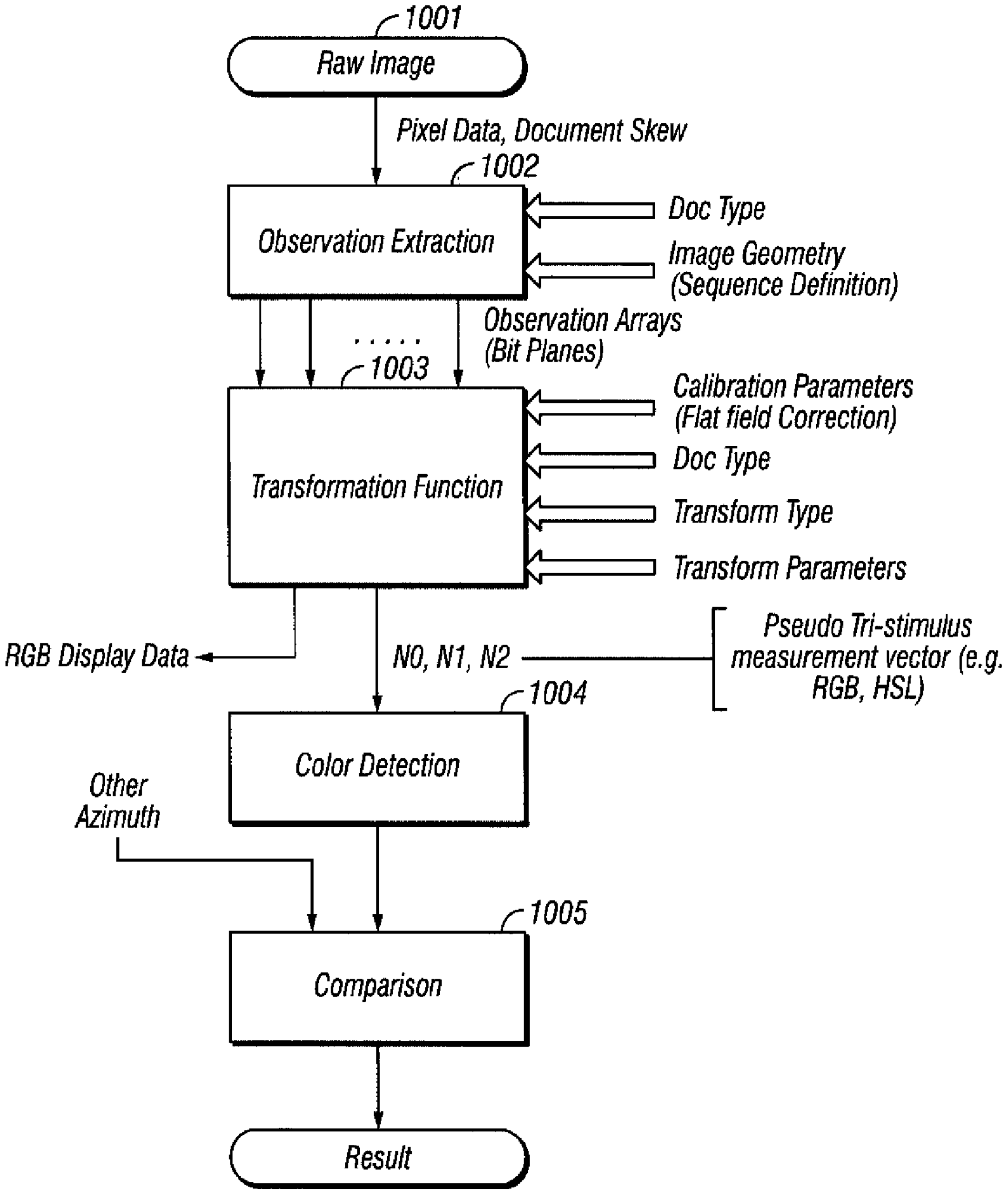
FIG. 10 is a flowchart that illustrates the overall process of applying sequenced illumination to detect color shifting elements in accordance with the present invention.

FIG. 10 is a flowchart that illustrates the overall process of applying sequenced illumination to detect color shifting elements in accordance with the present invention. The process begins with the acquisition of raw data (step 1001). This involves the capture of the interleaved image using the methods described above.

Once the raw image is acquired, the next step is observation extraction (step 1002). This is the process of extracting a multi-dimensional observation from the raw data based on the known document type: specific currency (e.g., US dollar or Euro), denomination and series (e.g., 1996 US twenty dollar bill), and specific orientation presented to the camera (e.g., front face left edge leading). Observation extraction is also based on the image geometry, which describes the illumination sequence (mode) that was used to acquire the raw data for this note type, as well as the known location and rotation of the document within the acquired image frame (document skew).

Following observation extraction, the invention applies a Transformation Function to the data (step 1003). This is a mathematical transformation function that converts the multi-dimensional observation data into a three-dimensional vector. This process can be quite complex and may be any linear or non-linear combination of the observation data. For example, the observation data may be a two-dimensional array corresponding to a certain rectangular region of the note, wherein each point in the two-dimensional array is a three-dimensional value containing a red, green, and blue reflectance value. The Transformation Function may convert this into a single three-dimensional measurement that contains a mean hue, saturation, and luminance value for the entire rectangular region. For example, when detecting color shifting elements, the transform may produce a hue value from the RGB values. Alternatively, the transform may produce an RIG ratio. Other methods may be used to determine the color reflected by the surface of the note.

From the Transformation Function, the system determines the detected color from the azimuth in question (step 1004). Steps 1003 and 1004 are performed in parallel for each azimuth of illumination.

After the system determines the reflected color in step 1004, it then compares this to the color detected from the other azimuth(s) (step 1005). If there is indeed a CSE present on the image region of the note the comparison in step 1005 will reveal a difference in the values between the azimuths, e.g., hue values or RIG ratios. By contrast, the values will not vary between azimuths if there is no CSE present.

The methods of sequential illumination described above are not limited to use with currency notes. They can also be applied to other types of documents that circulate widely such as checks, bonds, share certificates, etc.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A method for determining the presence of color shifting elements on documents, the method comprising the steps of:

(a) passing a document past an image sensor;

(b) sequentially illuminating said document using at least two alternating azimuths of illumination, wherein the document is divided into discrete successive sections and a predetermined azimuth of illumination is applied to each section as the document passes said image sensor until a predetermined area of the document is imaged, producing an interleaved, multi-azimuth image of said area of the document, wherein a first one of the at least two azimuths of illumination is associated with a first light source at a first azimuth relative to the document, wherein a second one of the at least two azimuths of illumination is associated with a second light source at a second azimuth relative to the document, and wherein the first azimuth is different from the second azimuth;

(c) applying a transformation function to said interleaved, multi-azimuth image to generate color values for each azimuth of illumination; and (d) comparing said color values, wherein variation in color value between azimuths of illumination indicates the presence of a color shifting element on the document.

2. The method, according to claim 1, wherein sequentially illuminating the document further comprises sequentially alternating different colors of illumination, wherein each color is applied to all azimuths of illumination before moving to the next color, producing an image interleaved according to color and azimuth.

3. The method according to claim 1, wherein sequentially illuminating the document further comprises alternating between red, green and blue light from two different azimuths, producing a six-way interleaved image.

4. The method according to claim 1, wherein the color value produced by the transformation function is a hue value.

5. The method according to claim 1, wherein, the color value produced by the transformation function is a red/green ratio.

6. The method according to claim 1, wherein the color shifting element is optically variable ink.

7. The method according to claim 1, wherein the color shifting element is color shifting foil.

8. The method according to claim 1, wherein the image sensor is a line scan camera and wherein the discrete sections of the document defined in the lookup table correspond to scan lines.

9. An apparatus for determining the presence of color shifting elements on documents, the apparatus comprising:

(a) an image sensor;

(b) two light sources positioned at different azimuths relative to a common focal point;

(c) means for synchronizing said image sensor with said light sources to sequentially illuminate a document passing in front of the image sensor using alternating azimuths of illumination, wherein the document is divided into discrete successive sections and a predetermined azimuth of illumination is applied to each section as the document passes said image sensor until a predetermined area of the document imaged, producing an interleaved, multi-azimuth image of said area of the document;

(d) means for applying a transformation function to said interleaved, multi-azimuth image to generate color values for each azimuth of illumination; and (e) means for comparing said color values, wherein variation in color value between azimuths of illumination indicates presence of a color shifting element on the document.

10. The apparatus according to claim 9, wherein each of said light sources further comprises red, green, and blue lights that sequentially illuminate document, alternating between each azimuth.

11. The apparatus according to claim 9, wherein the color value produced by the transformation function is a hue value.

12. The apparatus according to claim 9, wherein the color value produced by the transformation function is a red/green ratio.

13. The apparatus according to claim 9, wherein the color shifting element is optically variable ink.

14. The apparatus according to claim 9, wherein the color shifting element is color shifting foil.

15. The apparatus according to claim 9, wherein the image sensor is a line scan camera and wherein the discrete sections of the document defined in the lookup table correspond to scan lines.

16. The method according to claim 1, wherein passing the document past the image sensor comprises passing the document past a single image sensor at a single fixed location.

17. The apparatus according to claim 9, wherein the image sensor is a single image sensor at a single fixed location.

* * * * *